Figure 1:
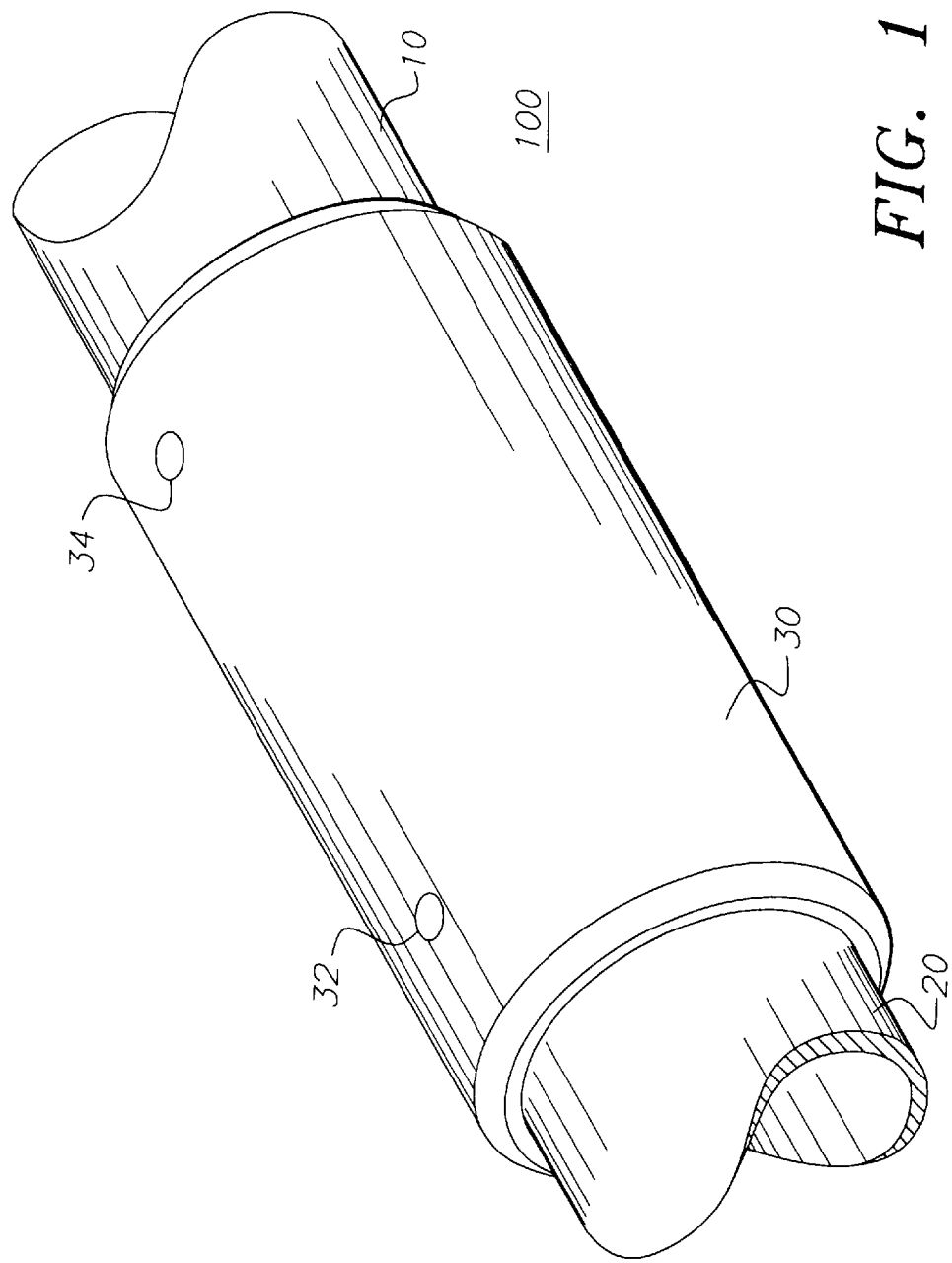

United States Patent [19]
Ungerman et al.

[11] Patent Number: 5,868,443
[45] Date of Patent: Feb. 9, 1999

[54] ANTI-ROTATION PIPE JOINT

[75] Inventors: James M. Ungerman, Feasterville; John P. Ungerman, Hatboro; Lawrence Shumaker, Malvern, all of Pa.

[73] Assignee: CertainTeed Corp., Valley Forge, Pa.

[21] Appl. No.: 944,113

[22] Filed: Oct. 6, 1997

Related U.S. Application Data

[63] Continuation of Ser. No. 565,078, Nov. 30, 1995, abandoned.

[51] Int. Cl.⁶ ........................................ F16L 37/14
[52] U.S. Cl. .................. 285/369; 285/305; 285/330; 285/913; 285/417
[58] Field of Search ........................ 285/369, 305, 285/330, 325, 913, 417; 464/153, 154, 157, 183

[56] References Cited

U.S. PATENT DOCUMENTS

| | | | |
|---|---|---|---|
| 1,054,812 | 3/1913 | Zierath | 285/913 |
| 1,556,745 | 10/1925 | Banta | 285/415 |
| 1,780,712 | 11/1930 | Little | 285/330 |
| 1,824,257 | 9/1931 | Bull | 285/330 |
| 1,849,423 | 3/1932 | Everett | 285/330 |
| 2,643,138 | 6/1953 | Jacobs et al. | 285/172 |
| 2,774,617 | 12/1956 | Lanninger | 285/71 |
| 2,890,066 | 6/1959 | Kerr | 285/330 |
| 3,206,936 | 9/1965 | Moor | 285/913 |
| 3,334,929 | 8/1967 | Wiltse | 285/305 |
| 3,606,401 | 9/1971 | Schwarz | 285/330 |
| 3,623,753 | 11/1971 | Henry | 285/913 |
| 3,735,928 | 5/1973 | Watts et al. | 239/267 |
| 3,759,553 | 9/1973 | Carter | 285/260 |
| 3,861,722 | 1/1975 | Kenyon | 285/337 |
| 3,865,410 | 2/1975 | Chen | 285/31 |
| 3,966,234 | 6/1976 | Sundholm | 285/24 |
| 4,092,036 | 5/1978 | Sato et al. | 285/337 |
| 4,135,738 | 1/1979 | Clements | 285/5 |
| 4,269,436 | 5/1981 | Medney | 285/47 |
| 4,314,717 | 2/1982 | Bjurman | 285/5 |
| 4,610,471 | 9/1986 | Halen et al. | 285/337 |
| 4,627,774 | 12/1986 | Bradley | 411/5 |
| 4,733,442 | 3/1988 | Asai | 285/913 |
| 4,779,900 | 10/1988 | Shumard | 285/114 |
| 4,821,818 | 4/1989 | Mefferd | 285/913 |
| 4,878,698 | 11/1989 | Gilchrist | 285/342 |
| 4,896,903 | 1/1990 | Shumard | 285/337 |
| 5,071,175 | 12/1991 | Kennedy, Jr. | 285/337 |
| 5,255,945 | 10/1993 | Toon | 285/305 |
| 5,269,572 | 12/1993 | Mefferd | 285/330 |
| 5,398,980 | 3/1995 | Hunter et al. | 285/337 |

FOREIGN PATENT DOCUMENTS

| | | | |
|---|---|---|---|
| 671103 | 9/1963 | Canada . | |
| 944406 | 3/1974 | Canada . | |
| 1397378 | 3/1965 | France | 285/305 |
| 287317 | 9/1915 | Germany | 285/330 |
| 2310375 | 9/1974 | Germany | 285/305 |
| 688307 | 3/1965 | Italy . | |
| 78524 | 5/1951 | Norway . | |
| 2136522 | 9/1984 | United Kingdom . | |
| 2276217 | 9/1994 | United Kingdom | 285/305 |

OTHER PUBLICATIONS

Alcoa Trade Literature entitled "Change for the Better With Alcoa Aluminum", Jan. 1, 1994.

Pacific Northwest Cooperative Extension Publication entitled "Sprinkler Irrigation", Mar. 1965.

*Primary Examiner*—Eric K. Nicholson
*Attorney, Agent, or Firm*—Duane, Morris & Heckscher LLP

[57] ABSTRACT

Mechanical pipe connections are provided by this invention which include an interlocking system between two pipes to be connected within a tubular fitting member. The interlocking system includes male and female portions which mechanically mesh together to form binding contact between the pipes to reduce the individual rotation of the pipes relative to one another.

13 Claims, 5 Drawing Sheets

ANTI-ROTATION PIPE JOINT

This is a continuation of application Ser. No. 08/565,078, filed Nov. 30, 1995, now abandoned.

FIELD OF THE INVENTION

This invention relates to devices for coupling pipes together, and more particularly, to the coupling of fluid transport piping so as to arrest rotation of one length of pipe relative to the adjacent length of pipe.

BACKGROUND OF THE INVENTION

Pipe junction restrainers and techniques for their assembly have been developed to make fluid-tight connections between two axially-aligned pipes, joints, valves, fittings, hydrants, or other types of fluid connections. Often, these junction restrainers must withstand extraordinarily great pressures associated with water distribution and sewer connections. Such devices may include, for example, segmented or split pipe joint retainer glands, which are well known and typically are secured together around a pipe section by ears or lugs formed on, or extending radially outwardly from, the gland segments.

It has been current practice to employ polyvinyl chloride (PVC) plastic pipe in new construction. One popular system employed for connecting PVC pipe, sold under the trademark CERTA-LOK™ and produced by CertainTeed Corporation, Valley Forge, Pa., provides a rather unique restrained joint between a pair of pipe sections for municipal, fire protection and other uses. The joint connector uses a series of o-ring seals and internal annular cavities that are filled externally with polymeric dowels after two sections of PVC pipe are inserted into the connector. These dowels also fill matching annular cavities located on the pipe sections to form a restraining mechanical lock that has a rating of 150 psi and up. Since the restraining mechanism of the CERTA-LOK™ joint connector is uniformly distributed around the PVC pipes, the risk of damaging the plastic sidewalls by localized stress fracture can be minimized.

It has been recently understood that the CERTA-LOK™ system permits each of the axially-aligned plastic pipes to rotate relative to one another after they are joined together. Such pipes often connect to a fluid pump, which creates torque throughout the piping system and may cause rotation of one or both pipes during the pumping of fluids. An excessive amount of rotation may cause damage due to abrasive wear on the outside of the pipe, or breakage to the electrical wires, and/or supporting cable for the pump.

One method of preventing the relative rotation of pipes coupled using a CERTA-LOK™ pipe connection system has been to install set screws through the tubular fitting member surrounding the pipe. Although this method has some effect on reducing rotation, the effect is often of limited value. Additionally, the lateral forces created by overtightening the set screws tend to push the pipes out of alignment, which has been known to cause some fluid leakage.

SUMMARY OF THE INVENTION

Mechanical pipe connections are provided by this invention which include a tubular fitting member designed to receive the ends of a pair of fluid pipes. The first and second ends of the first and second of these pipes comprise a male coupler and a matching female coupler recess which can be interlocked after the pipes are inserted into the tubular fitting member to minimize rotation between the pipes.

Accordingly, this invention provides mechanical means for fitting a pair of pipes locked together with a CERTA-LOK™ type system so as to minimize rotation during pumping operations and the like. In the preferred embodiment, a portion of the ends of each pipe are extended about 0.5–1.5 inches or so past the center line of the tubular fitting member to occupy non-extended space at the end of an opposing pipe. Rotation of either pipe will cause the extended approximately one-half circumference of the first pipe to come into contact with the extended approximately one-half circumference of the opposing pipe of this embodiment. This contact will inhibit the rotation of one pipe relative to the other pipe without the need for set screws. Of course, it will be apparent that less than one-half of the circumference of each pipe would be sufficient, so long as there is locking contact between a male coupling portion located on one pipe and the female coupling recess located on the other.

In another preferred embodiment of this invention a mechanical pipe connection is provided which includes a tubular fitting member having a pair of open ends for receiving a pair of pipe end portions. The fitting member includes an annular locking means for locking the fitting member to each of the pipe portions once they have been inserted. The first of the pipe end portions includes a male coupler extending therefrom, and a second of the pipe end portions includes a female coupler recess for receiving the male coupler in locking arrangement within the tubular fitting. This locking arrangement minimizes the degree to which the first and second pipe end portions can rotate relative to one another.

A BRIEF DESCRIPTION OF THE DRAWINGS

Figure 2:
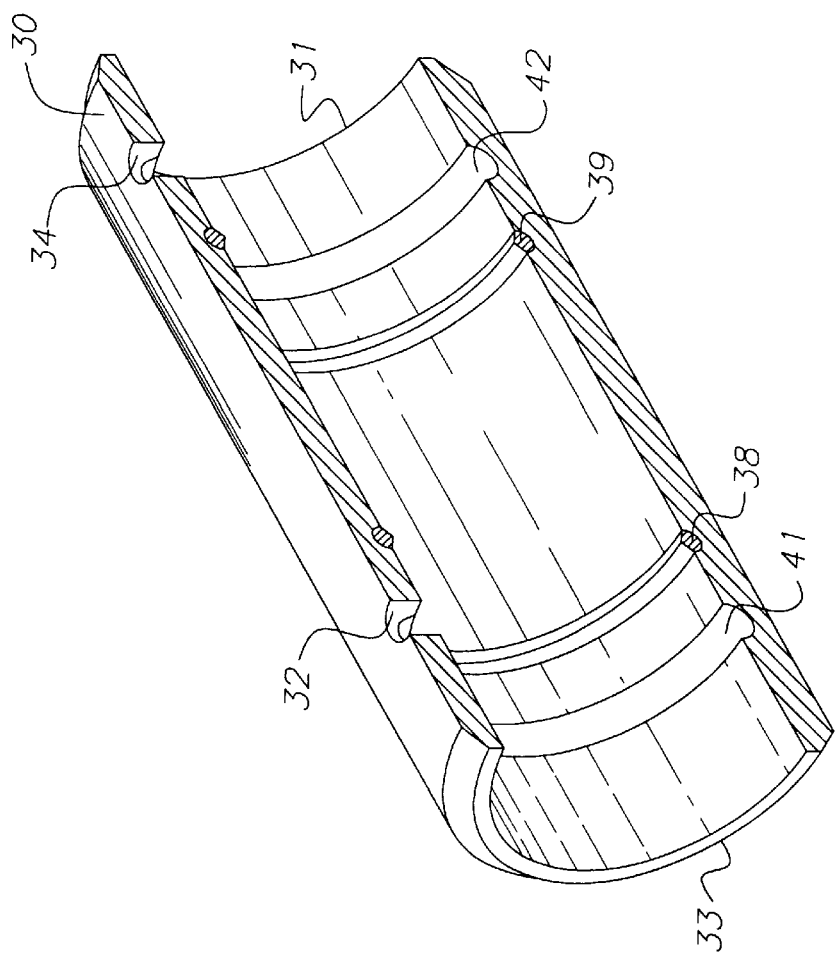
Figure 3:
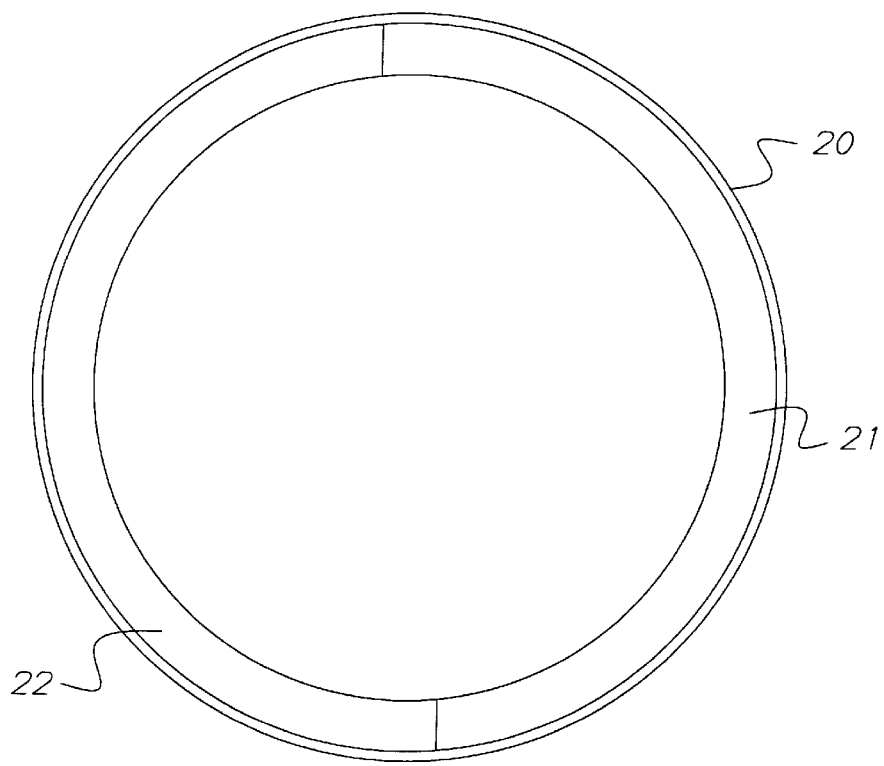
Figure 4:
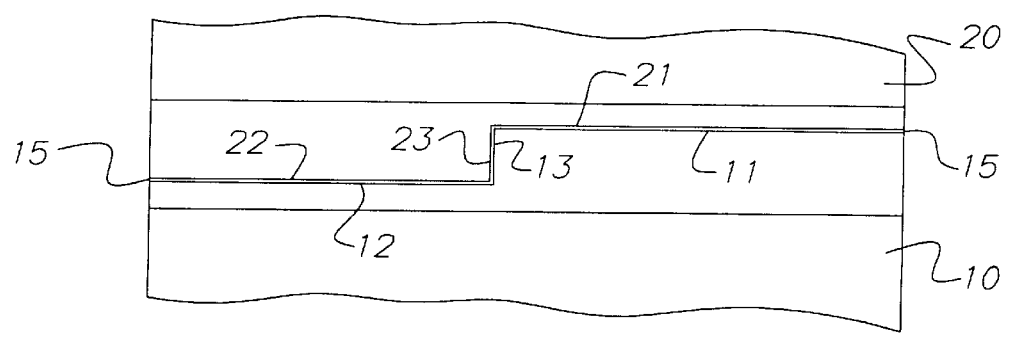
Figure 5:
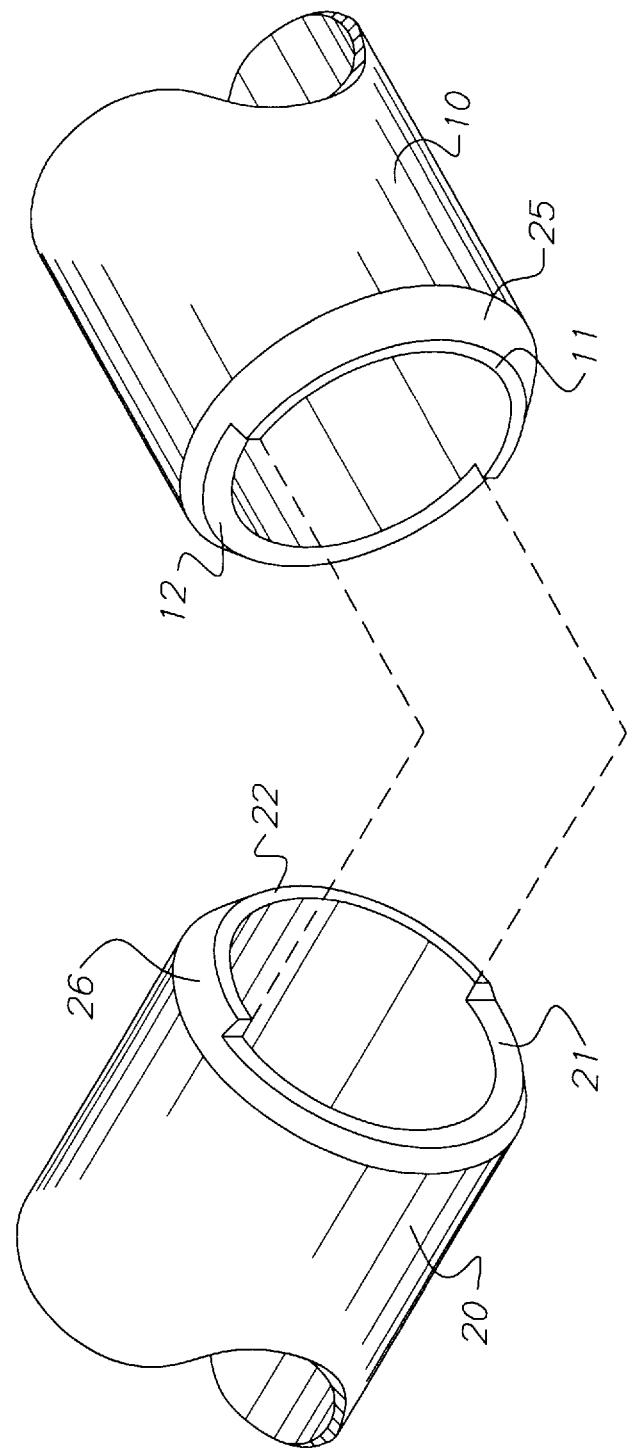
Figure 6:
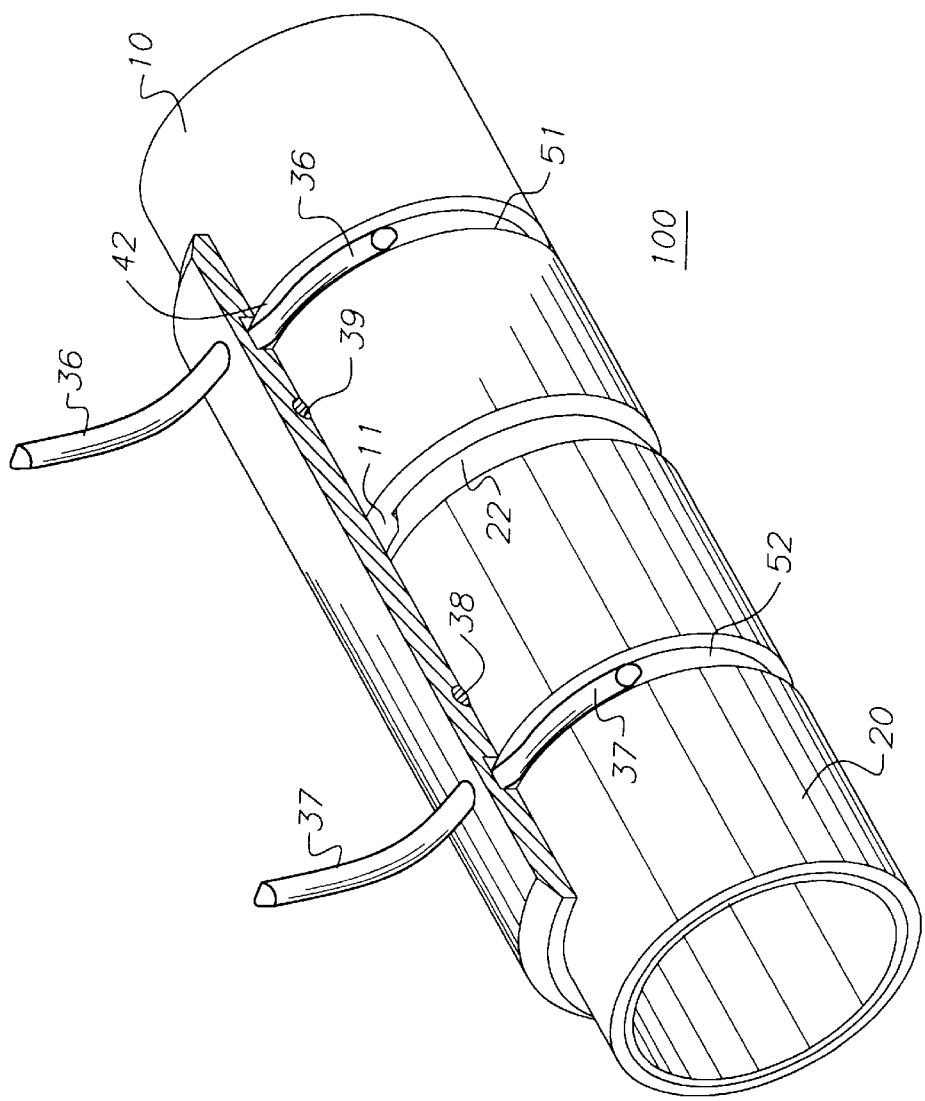

The accompanying drawings illustrate preferred embodiments of this invention according to the practical application of the principles thereof, and in which:

FIG. 1: is a front perspective view of a mechanical pipe connection of this invention;

FIG. 2: is a cross-sectional front perspective view of a preferred tubular fitting member of this invention;

FIG. 3: is a front elevation view of a preferred end portion of one of the pipes used in the mechanical pipe connection of this invention;

FIG. 4: is a side elevation, enlarged view of a joining area between a pair of pipes in the mechanical pipe connection of this invention;

FIG. 5: is an exploded, partial perspective view of a pair of pipes used in the mechanical pipe connection of this invention; and FIG. 6: is a partial, cross-sectional side perspective view of the mechanical pipe connection of this invention.

A DETAILED DESCRIPTION OF THE INVENTION

This invention provides mechanical joints, such as those used between piping materials, including pipes, valves, various pipe fittings, hydrants, and miscellaneous connections and piping systems, including sewer systems, water distribution systems, and chemical transport systems. As used herein, the term "pipe" includes all of the above connections and those that are consistent with the principles of this invention.

With reference to the figures, and particularly to FIGS. 1 through 6 thereof, the preferred mechanical pipe connection 100 will now be described. This connection 100 includes a tubular fitting member 30 having a pair of open ends 33 and 31, as shown in FIG. 2, for receiving a pair of pipes 10 and 20. The pipes are shown in axial alignment, although such a system could be employed even if these pipes are not aligned in a straight line. Although the tubular fitting member 30 is designed for meeting around the pipes 10 and 20, it is understood that pipes 10 and 20 could be less desirably fitted around the outside of the tubular fitting member 30, by reversing the location of the annular recesses 41, 42, 51 and 52 so as to form annular recesses on the inside surfaces of the pipes 10 and 20 and the outer surface of the tubular fitting member 30.

As shown substantially in FIGS. 2 and 6, pipes 10 and 20 are inserted into the first and second open ends 31 and 33 beyond the annular recesses 41 and 42 so as to come into a sealing contact with rubber gaskets 38 and 39. In typical CERTA-LOK™ systems, the pipes are spaced about 0.5 inches away from one another, so as to permit rotation during use. In a preferred embodiment of this invention, the end of the first pipe includes a male coupler and the end of the second pipe comprises a female coupler recess which can be interlocked within the tubular fitting member 30, preferably with one another as opposed to interlocking with the tubular fitting member 30, for reducing a rotation of the pipes relative to one another.

Once the pipes 10 and 20 are inserted sufficiently so as to approximately match their recesses 51 and 52 with the inner annular recesses 41 and 42 of the tubular fitting member 30, one or more flexible splines 36 and 37 can be inserted into the through-holes 32 and 34 conveniently bored through the sidewall of the tubular fitting member 30. In this way, a mechanical lock can be provided between the pipes 10 and 20 and the tubular fitting member 30 which is convenient to reverse, so as to enable removal of the pipes, if the system needs to be moved or replaced.

With reference to FIGS. 3–5, a preferred embodiment of the interlocking system of this invention will now be described. In the preferred pipe embodiment shown in FIG. 3, approximately one-half of the circumference of plastic pipe 20 is machined into a female portion 21, the other remaining portion is left as a male portion 22. Pipe 10 could also be fitted with male and female portions 11 and 12 respectively. Upon joining, as shown substantially in FIG. 4, male portion 11 fits with female portion 21 and female portion 12 fits with male portion 22. A clearance 15 of less than about 0.25 inches can be provided without interfering with the operation. When one or the other of pipes 10 and 20 begin to rotate, edge 13 comes in binding contact with edge 23 to minimize, or nearly eliminate rotation. In the preferred embodiment, the degree to which a portion of the plastic pipe is recessed, or machined away, can be greater than 90 degrees, but is more preferably about 180 degrees of the circumference of the pipe.

As shown in FIG. 5, the pipes 10 and 20 can be nearly mirror images of one another transposed 180 degrees apart, so that their mating male and female portions 11, 12, 21 and 22 fit together in a locking arrangement. Additionally, the extended male portions 22 and 11 and recessed female portions 12 and 21 can include beveled edges 25 and 26 along their outer periphery so as to permit smooth insertion into the tubular fitting member 30. Following insertion into the hollow cavity of the tubular fitting member 30, the annular recesses 51 and 52 of the pipes 10 and 20 come into alignment with the inner annular recesses 41 and 42 of the tubular fitting member 30 to form annular cavities. At that point the rubber gaskets 38 and 39 come into sealing contact with the outer diameter of pipes 10 and 20 to prevent any leakage from the mechanical pipe connection 100. Flexible splines 36 and 37 can thereafter be inserted into the through-holes 32 and 34 and into the formed annular cavities to create a mechanical lock between the pipes 10 and 20 and the tubular fitting member 30, as shown in FIG. 6.

From the foregoing, it can be realized that this invention provides improved pipe connections for minimizing the rotation of mechanically connected fluid pipes so as to avoid damaging electrical wiring or the pipe walls. The male-female locking interconnection of this invention can be easily produced by machining or molding matching recesses in the opposing surfaces of axially-aligned plastic, PVC pipes so that they meet in locking fashion to prevent separate rotation. Although various embodiments have been illustrated, this was for the purpose of describing, and not limiting the invention. Various modifications, which will become apparent to one skilled in the art, are within the scope of this invention described in the attached claims.

LIST OF REFERENCE NUMERALS

10 pipe
11 male portion
12 female portion
13 edge
15 clearance
20 pipe
21 female portion
22 male portion
23 edge
25 beveled edge
26 beveled edge
30 tubular fitting member
31 open end
32 through-hole
33 open end
34 through-hole
36 flexible spline
37 flexible splines
38 gasket
39 gasket
41 annular recess
42 annular recess
51 annular recess
52 annular recess
100 mechanical pipe connection

What is claimed is:
1. A reversible mechanical pipe connection comprising:
   first and second pipes having a first and second ends respectively;
   said first and second ends comprising a first pair of annular recesses;
   said connection further including a tubular fitting member having a second pair of annular recesses and a pair of open ends for slidably and rotatably receiving said first and second ends of said first and second pipes whereby said first and second pair of annular recesses become aligned to form a pair of annular cavities, said connection further including a pair of flexible splines disposed through a sidewall of said tubular fitting member to inhibit a longitudinal separation of said first and second pipes, said first end comprising a first pair of axially extended and recessed portions and said second end of said second pipe comprising a second pair of axially extended and recessed portions; said first and second ends interlocked within said tubular fitting member for reducing rotation of said first and second pipes when one of said first and second pipes experiences rotational torque.

2. The mechanical pipe connection of claim 1 wherein said extended portion comprises a remaining portion of said first end of said first pipe which has not been recessed.

3. The mechanical pipe connection of claim 1 wherein said first and second ends comprise portions wherein the circumference of said pipe has been removed.

4. The mechanical pipe connection of claim 1 wherein said extend and recessed portions comprise complementary surfaces for interlocking with one another to prevent rotation of said first and second pipes so as to reduce misalignment.

5. The mechanical pipe connection of claim 1 wherein said first and second ends of said first and second pipes comprise first and second recessed portions and first and second remaining portions, whereby said first recessed portion approximately matches the shape of said second remaining portion and said first remaining portion approximately matches the shape of said second recessed portion.

6. A reversible mechanical pipe connection comprising:
   at least two substantially linearly aligned pipes having end portions thereon,
   a tubular fitting member having a pair of open ends for slidably and rotatable receiving said pipe end portions, said tubular fitting member including annular locking means for locking the tubular fitting member to said pipe end portions, said annular locking means comprising a first pair of annular grooves disposed on an inside surface of said tubular fitting member, a second pair of annular grooves disposed on said end portions of said pipes, and a pair of flexible splines disposed through a sidewall of said tubular fitting member and into said first and second pair of annular grooves to inhibit longitudinal separation of said pipes;
   a first of said pipe end portions comprising a first pair of axially extended and recessed portions; and
   a second of said pipe end portions comprising a second pair of axially extended and recessed portions, said first and second end portions forming a separable locking arrangement within said tubular fitting member for minimizing the degree to which said first and second pipe end portions can rotate when one of said first and second pipes experiences rotational torque.

7. The mechanical pipe connection of claim 6 wherein said extended and recessed portions of said first and second pipe end portions approximately match one another in size and shape.

8. The mechanical pipe connection of claim 6 wherein said recessed portions of said first and second pipe and portions comprise curved recesses of greater than about 90 degrees.

9. The mechanical pipe connection of claim 8 wherein said curved recesses comprise about 180 degrees of the circumference of said first and second pipe end portions.

10. A method of making a reversible fluid pipe connection between at least a first and second pipe, comprising:
   (a) providing said first pipe having a first end portion including a first annular recess and first pair of integrally formed axially extended and recessed portions;
   (b) providing said second pipe having a second end portion including a second annular recess and a second pair of integrally formed axially extended and recessed portions;
   (c) providing a tubular fitting member having a pair of open ends for slidably and rotatable receiving said first and second end portions therein and a pair of annular recesses disposed on an internal surface, said tubular fitting member comprising annular locking means comprising a pair of flexible splines for locking said pair of annular recesses of said tubular fitting member to said first and second annular recesses of said first and second pipes;
   (d) inserting said first and second end portions into the open ends of said tubular fitting member so that they meet and nest together along said first and second pairs of axially extended and recessed portions, so as to minimize the degree to which said first and second end portions of said first and second pipes can rotate when one of said first and second pipes experiences rotational torque; and
   (e) inserting said flexible splines into said annular recesses to inhibit longitudinal separation of said pipes.

11. The method of claim 10 wherein said providing steps (a) and (b) comprise forming a recess in said first and second end portions to produce said extended portions and said recessed portions.

12. A reversible mechanical pipe connection comprising:
   first and second plastic pipes having first and second ends respectively, said first and second ends comprising integrally formed axially extended and recessed portions and a first pair of annular recesses; and
   a tubular fitting member having a second pair of annular recesses and a pair of open ends for slidably and rotatably receiving said first and second ends of said first and second plastic pipes whereby said first and second pair of annular recesses become aligned to form a pair of annular cavities, said connection further including a pair of flexible splines disposed through a sidewall of said tubular fitting member and into said pair of annular cavities to inhibit longitudinal separation of said first and second pipes, said first and second ends being interlocked along said extended and recessed portions within said tubular fitting member for reducing rotation of said first and second pipes when said mechanical pipe connection is made and one of said first and second pipes experiences rotational torque, said pipe connection being completed when said first and second plastic pipes are in direct contact with one another within said tubular fitting member.

13. The reversible mechanical pipe connection of claim 12 wherein said integrally formed extended and recessed portions on said first and second pipes are sized to nest within one another in a male-female relationship so as to minimize rotation of said first and second pipes relative to one another.

* * * * *